Patented June 26, 1934

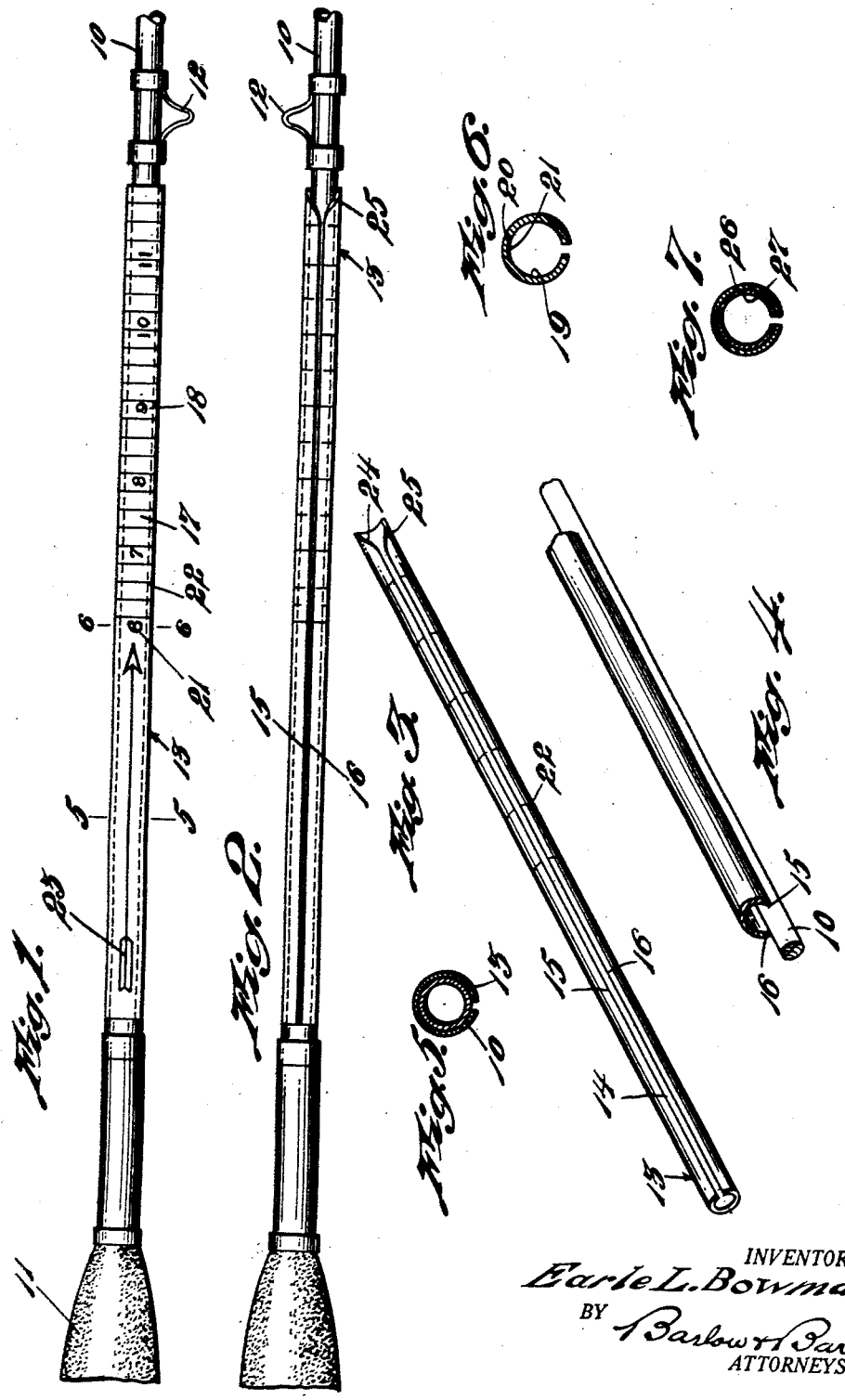

1,964,425

UNITED STATES PATENT OFFICE 1,964,425

FISHING ROD ATTACHMENT

Earle L. Bowman, Attleboro, Mass., assignor of one-half to John H. Spettigue, Attleboro, Mass.

Application January 12, 1932, Serial No. 586,129

2 Claims. (Cl. 33—107)

This invention relates to an attachment for a fishing rod, and has for one of its objects to provide a device which may be assembled with any fishing rod now in use.

Another object of this invention is the provision of an attachment having indicating markings thereon, which will be protected against obliteration or wear.

Another object of the invention is the provision of a device which will permit an ornamental finish provided on the rod to be observed therethrough and add to or enhance such ornate appearance.

Another object of the invention is the provision of an elastically resilient tube which is split throughout its length so that it may be snapped over a fishing rod to remain assembled therewith or changed from one rod to another as desired.

Another object of the invention is the provision of a construction which may be attached to the rod between the joints and such that it will not interfere with the detachment of the rod sections one from the other.

A further object of the invention is the provision of a construction which may remain assembled with a particular section, even though the sections are taken apart for storage or transportation, as desired.

A still further object of the invention is the provision of a construction which will be light in weight and when attached to the rod will not affect the balance of the rod when in use.

With these and other objects in view, the invention consists of certain novel features of construction, as will be more fully described, and particularly pointed out in the appended claims.

In the accompanying drawing:

Fig. 1 is a top plan view of a fragmental portion of a fishing rod showing my improved attachment as mounted in position.

Fig. 2 is a bottom plan view of the structure shown in Fig. 1.

Fig. 3 is a perspective view of the tubular attachment looking at the underside thereof and showing the separable edges extending longitudinally throughout its length.

Fig. 4 is a fragmental view of a portion of the attachment and a portion of the rod showing the manner of assembling the two.

Fig. 5 is a section on line 5—5 of Fig. 1.

Fig. 6 is a section on line 6—6 of Fig. 1 with the rod omitted.

Fig. 7 is a view similar to Fig. 6 showing a modified form of construction.

The game laws in many States provide that a fisherman shall not take fish under a certain length and that should a fish of shorter than the minimum length be caught it shall be thrown back into the water. This has necessitated the carrying of some measuring device by the fisherman that he may measure fish the length of which he cannot determine by estimate. Pocket scales have been resorted to but these require the use of one hand to hold the same and when an active fish is jumping around at the end of the line, it is rather awkward for the fisherman to hold a scale or the like for measuring purposes. Also, at times scales have been mounted on parts of fishing rods but this requires a specially constructed fishing rod and some manipulation of operating the same, and in order to avoid these undesirable conditions I have provided a tube of resilient transparent material such as celluloid and provided markings on the inner surface thereof, the tube being sufficiently light so as not to affect the balance of the rod, and the resiliency being such that the same is held firmly in place with the indications protected by being located on the inner surface of the tube; and the following is a detailed description of the present embodiment of this invention illustrating the preferred means by which these advantageous results may be accomplished.

With reference to the drawing, 10 designates generally a fishing rod having a handle 11 and provided along its length with guides 12 for the fish line. These guides occur adjacent the joints and frequently at a point intermediate the joints.

The attachment which I have provided consists of a celluloid tube designated generally 13 which is split as at 14 longitudinally throughout its length. The inner diameter of this tube is of a size normally smaller than the diameter of the rod 10 on which it is to be attached so that when the edges 15 and 16 of this tube are spread apart by forcing the same over the rod 10 as illustrated in Fig. 4, it will tightly grip the rod and hold the tube firmly in position.

The top or body portion 17 of the tube is provided with indicia 18 by recessing the inner surface 19 of the tube as at 20 in the shape of the characters desired, such as the numeral 6 designated at 21 and the marks indicating inches running circumferentially about the inner surface of the tube as indicated at 22, and in these recesses I provide some pigment or color which will distinguish these markings from the color of the resilient transparent material of which the tube is formed so that these indicia may be observed through the transparent tubular attachment. By this construction, when the tube is assembled on the rod, the indicia are protected by the outer surface of the tube against wear or being obliterated and thus always remain bright and readily observable through the obverse face of the tube.

It is frequent that the game laws provide that the minimum length of the fish caught will be six inches and accordingly I have not placed indicia on the body portion of the tube up to the minimum length, but have rather provided, by the manner of recessing above described, an arrow designated 23 extending from the end to the six inch mark on the tube which will be the first mark thereon and which is designated 6. Additional lengths of course may be determined from the inch designations 7, 8, 9, etc., with the half and quarter markings designated between these inch markings, the same being of different lengths as is usual in markings of this character. It is of course understood that any type of indicia may be used, whether it be inches, or other convenient designations.

For easy assembly I have cut away or inclined the edges 15 and 16 as at 24 and 25 so that in attachment to the rod this end may be forced over the rod by the application of pressure on the tube to force the necessary spreading of these edges 15 and 16 to receive the rod therethrough. This quick attachment is of particular assistance where the device is to be interchanged from one rod to another when desired. In some instances I may provide two layers of celluloid, designated 26 and 27, with the recesses and pigment therein in one of the contiguous surfaces to be between them and protected from wear by both inner and outer surfaces.

As I use a transparent material the finish of the rod may be observed through this attachment which by reason of the sheen on the smooth surface of the attachment, when made of celluloid or the like, will enhance the appearance of the rod to cause the same to be more ornate and will, at the same time, protect this finish against wear.

The length of each attachment is such that it will fit in between the joints of the rod and thus may remain upon the section upon which it is positioned after the sections are detached and will in no way interfere with detachment or manual manipulation of the rod.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A scale attachment for a fishing rod comprising a tube of elastically resilient transparent material split longitudinally throughout its length, the inner surface of said tube carrying directly measuring indicia along the length of said tube, and the edges of the split being adapted to be spread apart for application to the rod.

2. A scale attachment for a fishing rod comprising a tube of elastically resilient transparent material split longitudinally throughout its length, the inner surface of said tube being provided with recesses shaped as measuring indicia, material of a distinguishing color in said recesses to be observed through said transparent material and protected from wear by the outer surface of said material, the edges of the split along said tube being shaped at one end to flare outwardly to provide a ready entrance for the rod.

EARLE L. BOWMAN.